No. 771,277. PATENTED OCT. 4, 1904.
A. H. SCHWARZ.
PROCESS OF CONCENTRATING ORES.
APPLICATION FILED NOV. 6, 1903.
NO MODEL.
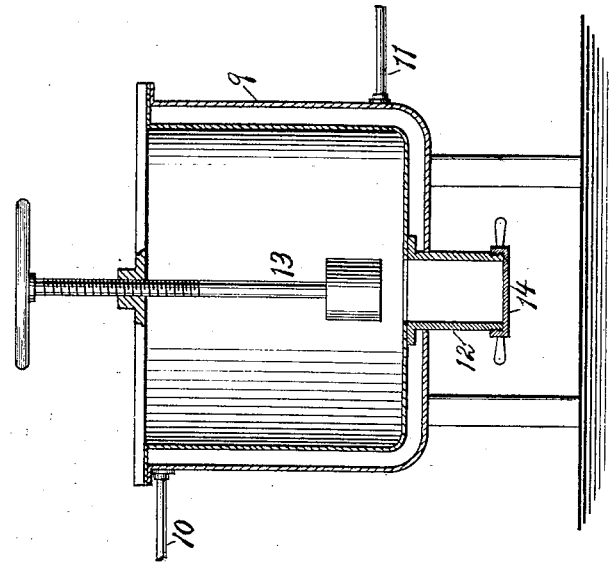
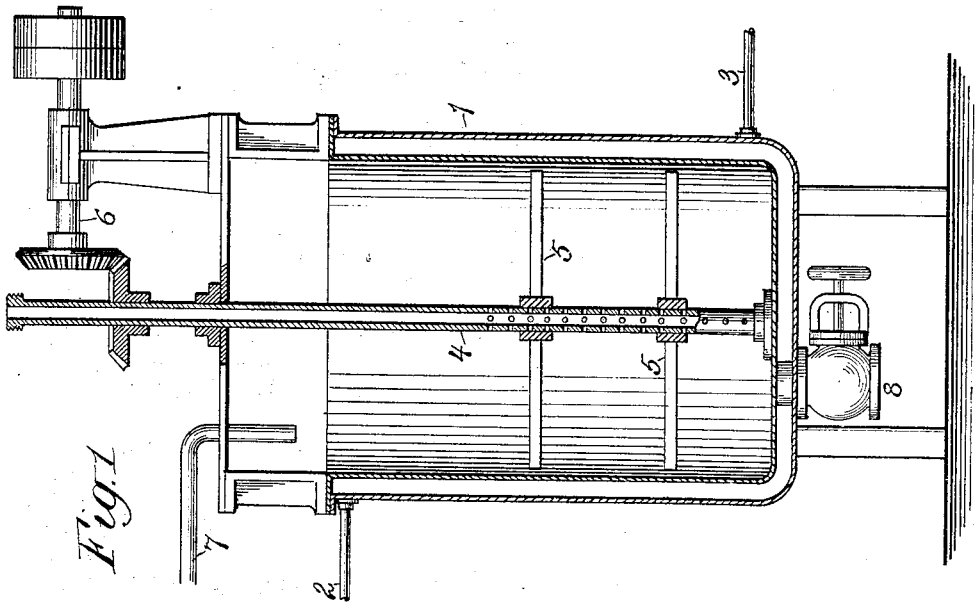
WITNESSES:
Otto P. Demers.
May L. Avery
INVENTOR
Alice H. Schwarz
BY
Charles D. Jones
Her ATTORNEY No. 771,277. Patented October 4, 1904.

UNITED STATES PATENT OFFICE.

ALICE H. SCHWARZ, OF NEW YORK, N. Y., ASSIGNOR TO SCHWARZ ORE TREATING COMPANY, A CORPORATION OF ARIZONA TERRITORY.

PROCESS OF CONCENTRATING ORES.

SPECIFICATION forming part of Letters Patent No. 771,277, dated October 4, 1904.

Application filed November 6, 1903. Serial No. 180,122. (No specimens.)

*To all whom it may concern:*

Be it known that I, ALICE H. SCHWARZ, a subject of the Emperor of Germany, and a resident of the borough of Manhattan, city, county, and State of New York, have invented certain new and useful Improvements in Processes of Concentrating Ores, of which the following is a specification.

My invention relates to a process for the concentration of metallic ores; and it consists, essentially, in subjecting crushed ore to a melted bath of paraffin or similar material, then solidifying the mass, removing the paraffin carrying the metallic constituents of the ore, and subjecting it to the action of heat to permit the precipitation of the concentrates, all as more fully hereinafter described and claimed.

The ore to be concentrated is first crushed to a convenient size for handling and is then discharged into a suitable vessel and there treated with a bath of melted paraffin, stearin, palmitin, or similar fatty material which is solid at normal temperatures. The crushed ore is thoroughly commingled with the fatty matter, any suitable form of agitator being employed for the purpose, and heat employed, if necessary, to maintain the fatty material in a liquid condition. After agitating for a sufficient length of time or until the fatty material is thoroughly mixed throughout the mass of ore, the source of heat is removed, and cold water admitted into the mass and the agitation continued until the fatty matter solidifies.

As the crushed ore and the melted fatty matter are mixed together the metallic constituents of the ore attach themselves to the fatty matter by adhesion; but the silica and other non-metallic portions have little or no attraction for the fatty matter. It results from this that when the cold water is turned into the vessel the fatty matter solidifies into a compact mass holding the metallic constituents of the ore, thereby effecting a separation of substantially all the values of the ore from the silica and other non-metallic constituents. The silica and other non-metallic constituents constituting the tailings or gangue settle in the bottom of the vessel and are drawn off with the water by any suitable means. The mass of solidified fatty matter including the metallic constituents is then treated to separate the metals from the fatty matter. This may be effected in any suitable form of vessel for liquefying the fatty matter. Upon subjecting the mass to the action of heat the fatty matter is liquefied and the metallic particles by reason of their specific gravity settle in the lower part of the vessel and may then be compressed and removed from the vessel in any suitable manner. The liquid fatty matter resulting from the separation may then be run to the concentrating vessel for the treatment of a fresh batch of ore.

Any suitable form of apparatus may be employed to carry out the necessary steps of the process above described.

In the accompanying drawings, in which Figure 1 is a central vertical section of a mixing-tank, and Fig. 2 a like section of a melting-tank, is illustrated means which may be employed.

Referring to the drawings, the numeral 1 designates a steam-jacketed vessel of suitable form and dimensions having the pipes 2 and 3, respectively, leading into and discharging from the jacket. The pipe 2 may connect with any suitable source of steam to be supplied in sufficient quantity to maintain the fatty matter in a melted condition during the agitation of the same with the ore. Suitably supported within the vessel 1 is a vertical shaft 4, having arms 5 attached thereto. The upper end of said shaft is connected with the power-shaft 6 through suitable gearing, by means of which the shaft 4 may be rotated, the said shaft and the arms 5 constituting an agitator. The fatty matter if melted outside of the vessel 1 may be introduced by means of a pipe 7. The vessel 1 is provided at its lower end with a valve 8, through which the water and tailings may be drawn off. The cold water employed to solidify the fatty matter may be introduced into the vessel 1 through any suitable means. For this purpose I have shown the shaft 4 perforated, and it may be connected at its upper end to any suitable source of water-supply.

In Fig. 2 I have shown a suitable form of apparatus in which the values may be separated from the fatty matter after the latter has been solidified in the vessel 1. The fatty matter containing the values is removed from the vessel 1 by any suitable means and placed in the steam-jacketed vessel 9, having a steam-supply pipe 10 and an outlet-pipe 11 for the water of condensation. The heat of the vessel 9 is sufficient to melt the fatty matter, and as this takes place the concentrates fall to the bottom of the vessel and may be compressed in the tubular portion 12 by means of a plunger 13. A cap 14 on the end of the portion 12 permits the removal of the concentrates, after which they may be subjected to any usual or suitable treatment.

In the above description I have referred to paraffin as a "fatty matter," using the term in such connection in a popular and not a chemical sense. The specification and claims are to be read with that understanding.

I am aware that emulsions or fats and oils thickened or acidulated by chemical reagents have heretofore been employed for the separation of the metals from the gangue, and I wish to be understood as disclaiming such method.

What I claim, and desire to secure by Letters Patent, is—

1. The method of concentrating ores which consists in mixing a melted fatty matter which is solid at normal temperatures with the ore, then solidifying the fatty matter and separating the gangue from the values entrained in the fatty matter while the latter is solidified.

2. The method of concentrating ores which consists in mixing a melted fatty matter which is solid at normal temperatures with the ore, then solidifying the fatty matter, then separating the gangue from the values entrained in the fatty matter while the latter is solidified, and finally liquefying the fatty matter to separate the values therefrom.

3. The method of concentrating ores which consists in mixing a melted fatty matter which is solid at normal temperatures with the ore, then solidifying the fatty matter by the introduction of cold water into the mass and separating the gangue from the values entrained in the fatty matter while the latter is solidified.

4. The method of concentrating ores which consists in mixing a melted fatty matter which is solid at normal temperatures with the ore, then solidifying the fatty matter and separating the gangue from the values entrained in the fatty matter while the latter is solidified, and agitating the mass during said mixing and solidifying operations.

5. The method of concentrating ores which consists in mixing a melted fatty matter which is solid at normal temperatures with the ore, then solidifying the fatty matter by the introduction of cold water into the mass and separating the gangue from the values entrained in the fatty matter while the latter is solidified, and finally liquefying the fatty matter to separate the values therefrom.

6. The method of concentrating ores which consists in mixing melted paraffin with the ore, then solidifying the paraffin and separating the gangue from the values entrained in the paraffin while the latter is solidified.

7. The method of concentrating ores which consists in mixing melted paraffin with the ore, then solidifying the paraffin by introducing cold water into the mass and separating the gangue from the values entrained in the paraffin while the latter is solidified, and finally separating the values from the paraffin.

In testimony whereof I have hereunto signed my name in the presence of two subscribing witnesses.

ALICE H. SCHWARZ.

Witnesses:
  OTTO P. OSMERS,
  GRACE L. HEASLEY.